(12) United States Patent
H N et al.

(10) Patent No.: US 12,423,881 B2
(45) Date of Patent: Sep. 23, 2025

(54) PRECISE ALIGNMENT OF AUGMENTED REALITY OBJECTS WITH PHYSICAL OBJECTS

(71) Applicant: INTERNATIONAL BUSINESS MACHINES CORPORATION, Armonk, NY (US)

(72) Inventors: Kiran Kumar H N, Bangalore (IN); Sarbajit K. Rakshit, Kolkata (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 18/058,294

(22) Filed: Nov. 23, 2022

(65) Prior Publication Data
US 2024/0169599 A1    May 23, 2024

(51) Int. Cl.
  *G06T 11/00* (2006.01)
  *G06V 20/20* (2022.01)

(52) U.S. Cl.
  CPC ............. *G06T 11/00* (2013.01); *G06V 20/20* (2022.01)

(58) Field of Classification Search
  CPC ................................. G06T 11/00; G06V 20/20
  See application file for complete search history.

(56) References Cited

U.S. PATENT DOCUMENTS

| | | | |
|---|---|---|---|
| 10,802,695 B2 | 10/2020 | Daniels | |
| 11,010,965 B2 | 5/2021 | Stachniak | |
| 11,120,639 B1* | 9/2021 | Smith | G06F 3/011 |
| 11,176,758 B2 | 11/2021 | Price | |
| 2019/0278091 A1* | 9/2019 | Smits | G03B 35/18 |
| 2021/0110191 A1* | 4/2021 | Gruteser | G06N 3/045 |
| 2022/0129066 A1* | 4/2022 | Zahnert | G06F 3/012 |
| 2022/0130126 A1* | 4/2022 | Delgado | G06T 7/521 |
| 2022/0159020 A1* | 5/2022 | Wang | H04L 43/062 |
| 2022/0254072 A1* | 8/2022 | Scerra | G06K 7/1413 |
| 2022/0377615 A1* | 11/2022 | Radunovic | G06F 11/3428 |
| 2023/0143232 A1* | 5/2023 | Balazs | H04L 63/1466 |
| | | | 709/223 |

(Continued)

FOREIGN PATENT DOCUMENTS

WO    2022023789 A1    2/2022

OTHER PUBLICATIONS

On the Design of Edge-Assisted Mobile IoT Augmented and Mixed Reality Applications (Year: 2021).*

(Continued)

*Primary Examiner* — Xiao M Wu
*Assistant Examiner* — Latrell Anthony Creary
(74) *Attorney, Agent, or Firm* — Robert D. Bean

(57) ABSTRACT

According to one embodiment, a method, computer system, and computer program product for precise alignment of one or more augmented reality objects is provided. The present invention may include identifying one or more physical objects in a physical environment that will be overlaid with the one or more AR objects; monitoring positions of the one or more identified physical objects with an AR device and one or more connected computing devices; analyzing data of the one or more identified physical objects; and aligning the one or more AR objects precisely to the one or more identified physical objects based on the analyzed data of the one or more physical objects.

20 Claims, 4 Drawing Sheets

(56) References Cited

U.S. PATENT DOCUMENTS

2024/0169590 A1* 5/2024 Ishihara ............ G02B 27/0172
2024/0233342 A1* 7/2024 Cheng ................. G06V 10/774

OTHER PUBLICATIONS

Phupattanasilp, et al., "Augmented Reality in the Integrative Internet of Things (AR-IoT): Application for Precision Farming," Sustainability [article], May 9, 2019, 17 pages, vol. 11, No. 9, Article No. 2658, MDPI, DOI: 10.3390/su11092658, Retrieved from the Internet: <URL: https://www.mdpi.com/2071-1050/11/9/2658>.

* cited by examiner

PRECISE ALIGNMENT OF AUGMENTED REALITY OBJECTS WITH PHYSICAL OBJECTS

BACKGROUND

The present invention relates, generally, to the field of computing, and more particularly to augmented reality.

Augmented reality (AR) is a technology that uses software to overlay virtual information onto a physical environment to provide a person with an enhanced experience. Augmented reality creates a real-time interactive experience by displaying visual, auditory, and/or other sensory information onto a real-world environment. Currently, AR can be used to align augmented reality objects with physical objects by predefining their locations relative to each other. However, for an AR system to provide a user with as real of an experience as possible, the digital objects need to be precisely aligned to the physical objects to ensure no latency in recognizing the reposition of the physical objects throughout their movements. Precise alignment of AR objects with physical objects is a driving factor of success in AR and greatly impacts a user's AR experience. Thus, an improvement in augmented reality has the potential to benefit the overall user experience.

SUMMARY

According to one embodiment, a method, computer system, and computer program product for precise alignment of one or more augmented reality objects is provided. The present invention may include identifying one or more physical objects in a physical environment that will be overlaid with the one or more AR objects; monitoring positions of the one or more identified physical objects with an AR device and one or more connected computing devices; analyzing data of the one or more identified physical objects; and aligning the one or more AR objects precisely to the one or more identified physical objects based on the analyzed data of the one or more physical objects.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
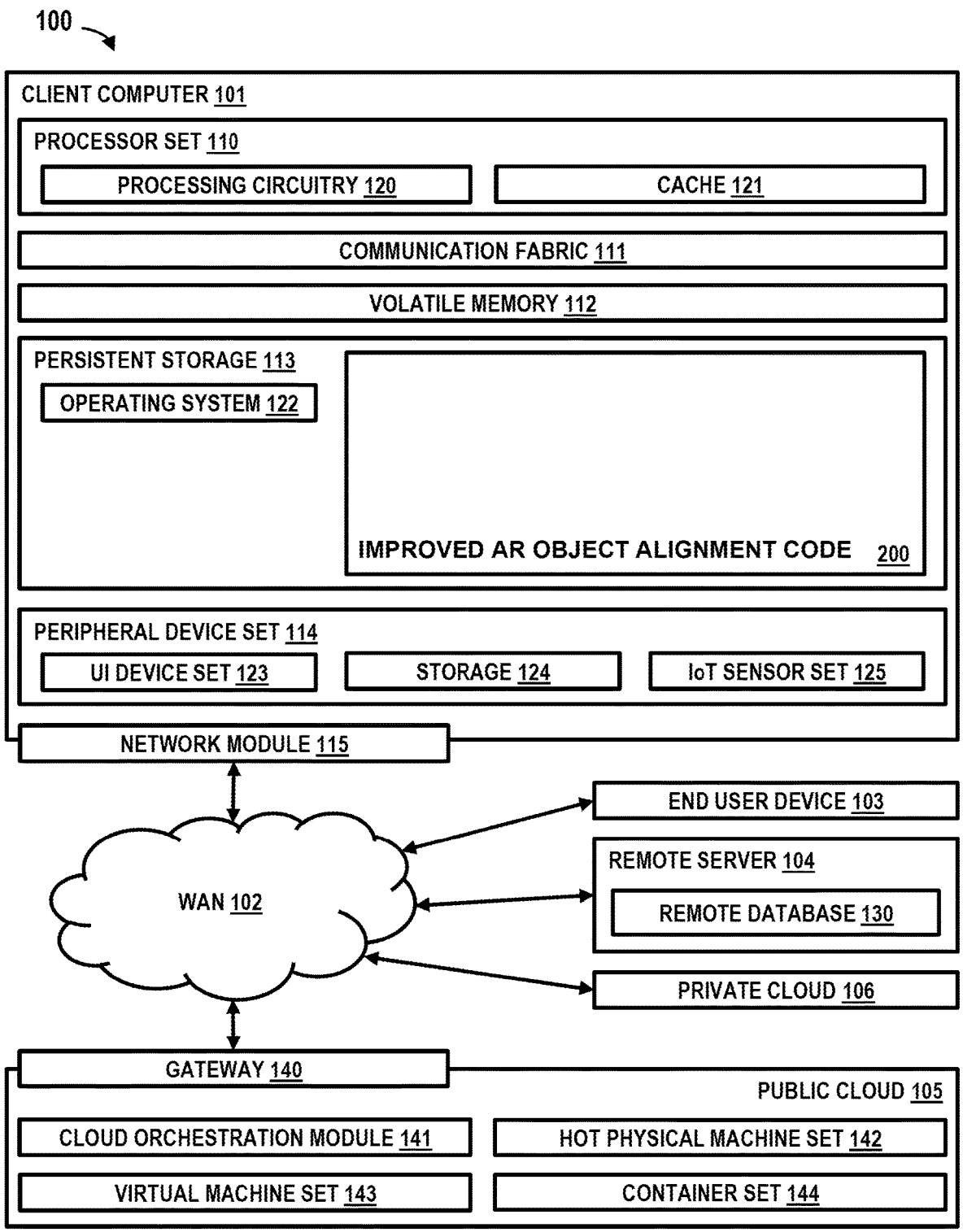
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In an augmented reality environment, AR objects are aligned over a physical object counterpart in the physical environment and displayed to a user. The AR objects are meant to be aligned over their physical object counterparts at all times while a user is in the AR environment. However, latency in recognizing the repositioning of physical objects in the physical environment can occur, thus, causing the AR objects to become misaligned from their physical object counterparts in the AR environment. AR objects being misaligned from physical objects can lead to a poor user experience, such as when a user is trying to interact with a misaligned AR object over a moving physical object and thus, experiences difficulty in attempting to interact with the AR object. For example, if a user is trying to drop an AR ball into an AR basket but the AR basket is misaligned with the physical basket, the user may successfully experience dropping the AR ball into the AR basket in the AR environment, however, in reality, the user may actually be dropping the physical ball on the side of the physical basket. Therefore, problems can arise, like the physical ball landing on the user's foot, and possibly causing injury to the user. Therefore, it may be likely that a user has a poor AR experience because of the lack of precise alignment of the AR objects over the physical objects.

One way in which current methods attempt to address problems with aligning AR objects with physical objects is by predefining their locations relative to each other. The AR system analyzes images of the physical object to generate a digital outline, determines the position and scale of the physical object, creates a model of the physical object, and then overlays the AR object over the model of the physical object. However, several deficiencies exist with aligning AR objects with physical objects by predefining. One of the deficiencies of aligning AR objects with physical objects by predefining is that the AR objects are only precisely aligned to the physical objects when static because the model of the physical object does not account for the movement of the physical object. For example, if a physical object begins moving in an angular direction away from the user, there will be latency in the AR device recognizing the reposition of the physical object, and thus, the AR object will be misaligned with the physical object. Thus, an improvement in augmented reality has the potential to enhance the users' interactions with the AR objects, and thus, benefit the overall user experience.

The present invention has the capacity to improve augmented reality by precisely aligning AR objects over physical objects. The present invention uses AR with an IoT and edge-based computer system to identify computing devices for a user to connect to the program so that the needed level of precision for the alignment of the AR objects can be achieved. This improvement in the alignment of AR objects over physical objects can be accomplished by implementing a system that identifies physical objects in a physical environment that will be overlaid with AR objects, classifies the movement characteristics of the identified physical objects, identifies the needed level of precision for the AR objects, and precisely aligns the AR objects over the physical objects based on the data gathered from the analysis of the physical objects. The improvement in the alignment of AR objects over physical objects can be further accomplished by implementing a system that evaluates the alignment performance of the AR device and the connected computing devices, determines if additional computing devices are needed to perform the precise alignment of the AR objects, analyzes the physical objects using the AR device and the connected computing devices, and precisely aligns the AR objects over the physical objects based on the data gathered from the analysis of the physical objects.

In some embodiments of the invention, the augmented reality object alignment determination program, herein referred to as "the program", can render an augmented reality simulated environment. The AR simulated environment, herein referred to as "the AR environment", may be a hybrid environment comprising both physical and virtual elements. The program may accurately register and display both physical and virtual objects within the physical environment, such that virtual elements are anchored to a physical location. The AR environment may comprise a hybrid physical/virtual world in which one or more users may enter, see, move around in, interact with, etc. through the medium of an AR device. The AR environment may comprise an environment wherein generated images, sounds, haptic feedback, and other sensations are integrated into a real-world environment.

The program can analyze a user's surrounding area and can recognize the physical objects in the surrounding area that will be overlaid with AR objects. The program can identify the physical objects by performing object recognition with the AR device and/or IoT devices. The program can identify a user's desired level of precision for the alignment of the AR objects with the identified physical objects. The program can identify the desired level of precision for an AR object based on a user's input to a prompt asking the user how precise the user desires the overlaying of the AR object to be.

The program can classify the movement characteristics of the physical objects in the surrounding area. The program may classify the movement characteristics by both analyzing the positions of the physical objects in the physical environment and the physical environment itself. Based on the analysis of both the positions of physical objects in the physical environment and the physical environment itself, the program can identify the movement characteristics of the physical objects. The AR device and IoT devices can track the surge, heave, sway, yaw, pitch, and roll changes in the position and orientation of physical objects. The AR device and IoT devices can monitor the movements of physical objects by continuously refining the positions of the physical objects. The IoT devices can send data relating to the movements of the physical objects to the program and/or edge device(s). Edge devices can be used to assist the program in processing data from the IoT devices, thus, compensating for the lack of an AR device's computing power. The program can analyze the data relating to the movements and positions of the physical objects using coordinate systems, such as cartesian coordinates, spherical polar coordinates, or cylindrical coordinates, to determine changes in the positions of the physical objects.

In some embodiments of the invention, if the AR device and the connected IoT devices are unable to continuously track the relative positions of the physical objects and/or are unable to quickly process the data from the connected IoT devices to avoid latency with the AR objects, the program may recommend computing devices, which comprise additional IoT devices and/or edge devices, that are needed for the program to both continuously track the movements of the physical objects and process the data from the IoT devices, respectively, in order for the program to minimize the latency of the AR objects to the degree needed by the user. In some embodiments of the invention, the program may direct the user on where to place the IoT devices and/or edge devices in the physical environment to thereby optimize data capturing and processing. The program may offload data processing to the one or more edge devices. The program can offload a quantity of data processing to the one or more edge devices based on the amount of processing required and can store data faster so that the program can precisely overlay the physical objects with the AR objects to achieve the user's desired level of precision.

The program can precisely align the one or more AR objects over the one or more physical objects based on the received data from the edge devices and/or the IoT devices and/or the AR device. The program can precisely overlay AR objects over physical objects based on the positions of the physical objects. Based on the received data from the IoT devices and/or edge devices and/or AR device, the program can continuously determine the positions of the physical objects by monitoring the continuous changes in the relative positions of the physical objects. The program can precisely overlay the AR objects over the physical objects and can maintain the desired level of precision of the AR objects over the physical objects by continuously updating the positions of the physical objects dynamically.

The program may use artificial intelligence in determining what additional computing devices are needed to minimize the latency of AR objects to the degree needed by the user and are needed for the program to offload data to assist in data processing, by utilizing one or more machine learning models to ingest the data gathered by tracking the movements of physical objects in the AR environment, the AR device and the computing devices used to track the movements of the physical objects, and the computing devices used to offload data processing from the AR device. The program may use artificial intelligence in determining what additional IoT device(s) are needed to minimize the latency of AR objects to the degree needed by the user and what edge device(s) are needed for the program to offload data to assist in data processing, by utilizing one or more machine learning models to ingest the data gathered by tracking the movements of physical objects in the AR environment, the AR device and the computing devices used to track the movements of the physical objects, and the computing devices used to offload data processing from the AR device. The machine learning models may be trained to identify what computing devices are needed for the program to both continuously track the movements of physical objects and process the data from the IoT devices, in order for the program to precisely align the AR objects over the physical objects in an AR environment. The machine learning models may be trained on a knowledge corpus comprising learned information gathered from the AR device, IoT devices, and the edge devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to precisely align AR objects over physical objects by identifying the physical objects in the physical environment that will be overlaid with AR objects, classifying the movement characteristics of the physical objects, identifying the needed level of precision for the AR objects, evaluating the alignment performance of the AR device and the connected computing devices, determining if additional computing devices are needed to perform the precise alignment of the AR objects, analyzing the physical objects using the AR device and the computing devices, and precisely aligning the AR objects over the physical objects based on the data gathered from the analysis of the physical objects.

Referring to FIG. 1, an exemplary networked computer environment 100 is depicted, according to at least one embodiment. Computing environment 100 contains an example of an environment for the execution of at least some of the computer code involved in performing the inventive methods, such as improved AR object alignment code 200. In addition to code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
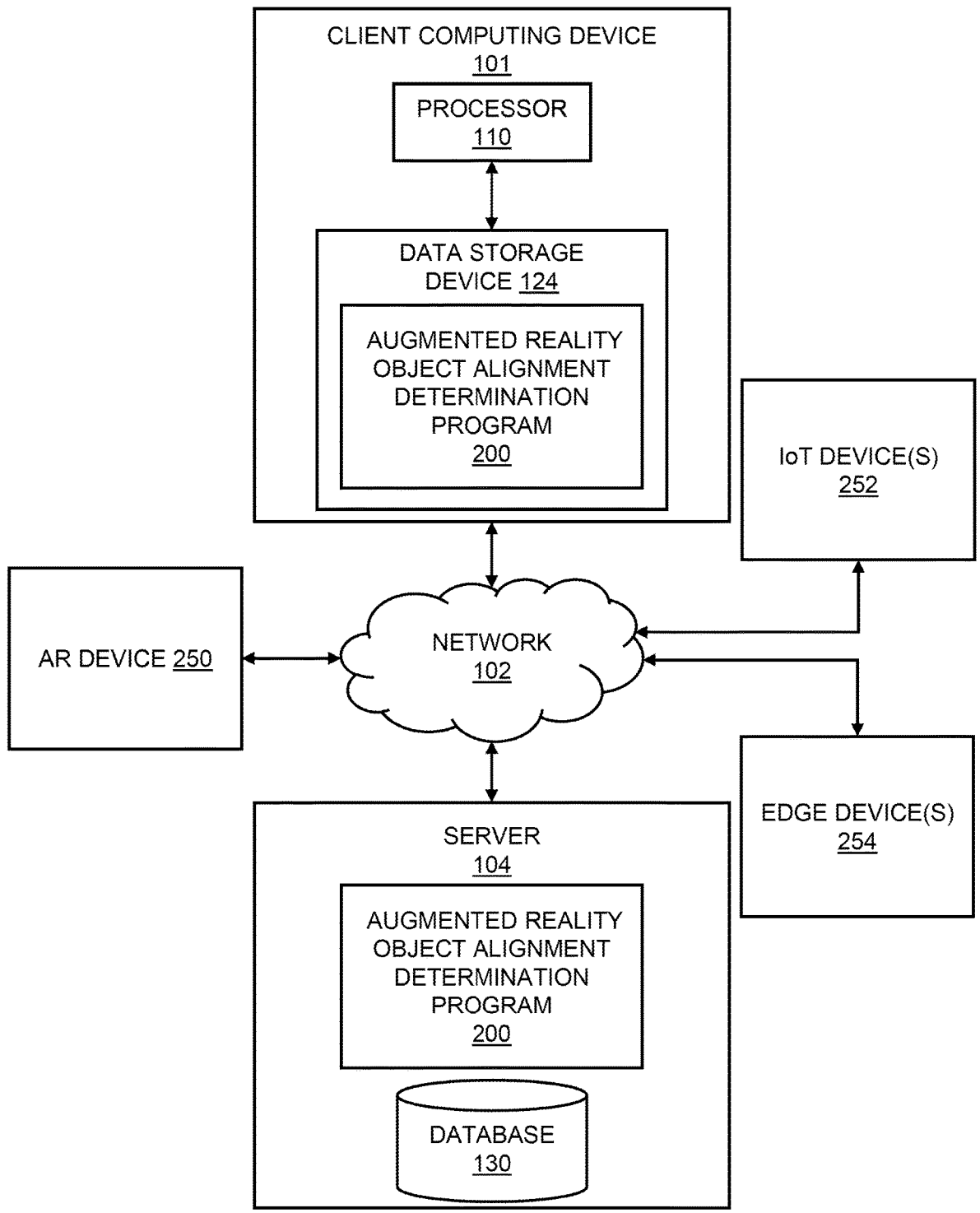
FIG. 2 illustrates an exemplary application invention environment according to at least one embodiment.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run an augmented reality object alignment determination program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running an augmented reality object alignment determination program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can comprise a knowledge corpus. The knowledge corpus may comprise information relating to previously used AR devices 250, IoT devices 252, and edge devices 254. Additionally, the knowledge corpus can comprise information relating to the AR devices' 250, IoT devices' 252, and edge devices' 254 alignment performance, such as how precisely an IoT device 252 can track a physical object moving a further distance away from the IoT device 252, or the amount of data an edge device 254 can process and the speed at which the edge device 254 can process the data. The knowledge corpus may be updated based on the AR devices 250, IoT devices 252, and the edge devices 254 used, the continuous tracking of physical objects, and the continuous mapping of AR objects to physical objects. The knowledge may comprise information relating to object recognition. Additionally, the knowledge corpus can comprise information related to the data point mapping of the AR objects to physical objects.

Augmented Reality (AR) device 250 may be any device or combination of devices enabled to record-world information that the AR module 402 may overlay with computer-generated perceptual elements to create an AR environment. The AR device 250 can display an AR simulated environment to a user and allow the user to interact with the AR environment. The AR device 250 can be a headset. Also, the AR device 250 can comprise a head-mounted display (HMD). Additionally, the AR device 250 may be equipped with or comprise a number of sensors, such as a camera, microphone, and accelerometer, and these sensors may be equipped with or comprise a number of user interface devices such as touchscreens, speakers, etc.

IoT device(s) 252 may be any device capable of continuously identifying the relative positions of physical objects while static or in movement. The IoT device(s) 252 can comprise cameras, such as any device capable of recording visual images in the form of photographs, films, or video signals, such as a physical or virtual camera, and/or sensors, such as accelerometers, gyroscopes, magnetometers, proximity sensors, pressure sensors, etc.

Edge device(s) 254 may be any device capable of processing data. The edge device(s) can comprise edge routers, routing switches, firewalls, multiplexers, and/or other WAN devices. Additionally, the edge device(s) 254 may comprise built-in processors with onboard analytics and/or artificial intelligence capabilities.

According to the present embodiment, the augmented reality object alignment determination program 200, herein referred to as "the program", may be a program capable of identifying one or more physical objects in a physical environment, evaluating the alignment performance of the AR device 250 and the connected computing devices 252, and 254, determining if additional computing devices 252, and 254 are needed to perform the precise alignment of the AR objects, analyzing the physical objects using the AR device 250 and the connected computing devices 252, and 254 and precisely aligning the one or more AR objects to the one or more physical objects. The program 200 may be located on client computing device 101 or remote server 104 or on any other device located within network 102. Furthermore, the program 200 may be distributed in its operation over multiple devices, such as client computing device 101 and remote server 104. The augmented reality object alignment determination method is explained in further detail below with respect to FIG. 3.

Figure 3:
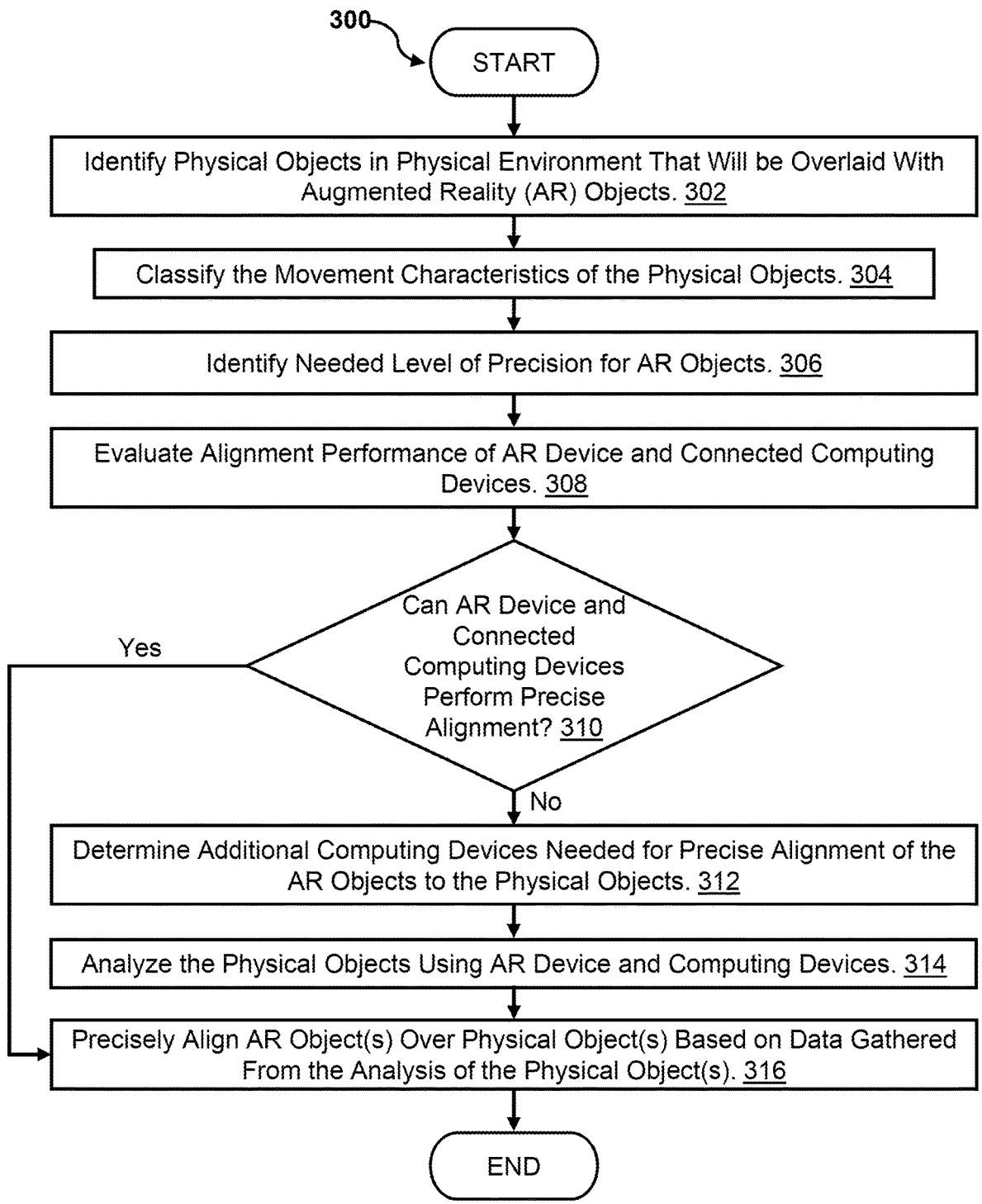
FIG. 3 is an operational flowchart illustrating an augmented reality object alignment determination process according to at least one embodiment.

Referring now to FIG. 3, an operational flowchart illustrating an augmented reality object alignment determination process 300 is depicted according to at least one embodiment. At 302, the program 200 identifies the physical objects in the physical environment that will be overlaid with AR objects. The program 200 can recognize physical objects in the physical environment. The program 200 recognizes the physical objects by performing object recognition using the AR device 250 and/or IoT devices 252, such as a camera. The program 200 can identify the number of physical objects in the physical surrounding that are to be overlaid with AR objects. A physical object can be a real-world object. The physical environment can be a user's real-world surroundings. A user may be any person who is using the AR device 250. IoT devices 252, such as sensors and cameras, may be set up in a physical environment to monitor the physical objects and the physical environment. Additionally, IoT devices 252 may be worn by the user.

At 304, the program 200 classifies the movement characteristics of the physical objects in the area. Movement characteristics may comprise properties of motion, such as displacement or velocity, directions of motion, such as horizontal or vertical, and static or dynamic. For example, a physical object may be static, moving in an angular direction away from the AR device 250, moving at various speeds, changing directions, or oscillating in and out of motion. The program 200 classifies the movement characteristics by analyzing both the positions of physical objects in the physical environment and the physical environment itself. Based on the analysis of both the positions of physical objects in the physical environment and the physical environment itself, the program 200 can identify the movement characteristics of the physical objects. The AR device 250 and IoT devices 252 can track the surge, heave, sway, yaw, pitch, and roll changes in the position and orientation of the physical objects. The AR device 250 and the IoT devices 252 can monitor the movements of the physical objects by continuously refining the positions of the physical objects. The IoT devices 252 can send the data relating to the movements of the physical objects to the program 200 and/or the edge device(s) 254. The program 200 and/or the edge device(s) 254 can analyze the data relating to the movements of the physical objects using coordinate systems, such as cartesian coordinates, spherical polar coordinates, or cylindrical coordinates, to determine changes in the positions of the physical objects. The program 200 may offload data processing to the one or more edge devices 254. The program 200 can offload a quantity of data processing to the one or more edge devices 254 based on the amount of data the AR device 250 can process without the latency of the AR objects. The edge device(s) 254 may send the analyzed data to the program 200.

At 306, the program 200 identifies the needed level of precision for the AR objects. The program 200 can identify the needed level of precision for an AR object based on a user's input on a graphical user interface (GUI). The GUI can be located on the AR device 250. The AR device 250 and/or IoT devices 252 may track the user's movements to determine a user's input to the GUI. The program 200 can display a prompt asking the user how precise an AR object needs to be overlaid onto a physical object. For example, the user may input that the AR object needs to be exactly aligned with a physical object during movement or may input that the AR object can be 10 cm offset from the AR object. If no input is detected from the user, the program 200 may identify that the AR object needs to be aligned exactly to the physical object, such that no latency occurs during the movement of the physical object.

At 308, the program 200 evaluates the alignment performance of the AR device 250 and the connected computing devices 252, and 254. Computing devices 252, and 254 may comprise the IoT device(s) 252, and edge device(s) 254. The program 200 may evaluate the alignment performance of the AR device 250 and the connected computing devices 252, and 254 to determine if the computing power of the AR device 250 and the connected computing devices 252, and 254 is high enough to align the AR objects to the physical objects without experiencing latency during the movements of the AR objects. The program 200 can evaluate the alignment performance of the AR device 250 and the connected computing devices 252, and 254 based on the movement characteristics of the identified physical objects in the physical environment. The program 200 can determine if the AR device 250 and the connected computing devices 252, and 254 can precisely identify the relative positions of the physical objects and process the captured data in a prompt manner so that the program 200 can meet the needed level of precision for AR object overlaying. Several variables may contribute to how much computing power is necessary to precisely align the AR objects to the physical objects, such as the movement characteristics of the identified physical objects in the physical environment, for example, the speed of a physical object, the angle at which a physical object moves away from the AR device 250 or the IoT devices 254, or the distance of the physical object from the AR device 250 and the IoT devices 254, etc.

Then, at 310, the program 200 determines if the AR device 250 and the connected computing devices 252, and 254 can perform the precise alignment of the AR objects to the physical object(s). According to one implementation, if the program 200 determines that the precise alignment can be performed by the AR device 250 and the connected computing devices 252, and 254 (step 310, "YES" branch), the program 200 may continue to step 316 to precisely align the AR objects over the physical objects. The program 200 can determine that the AR device 250 and the connected computing devices 252, and 254 may perform the precise alignment of the AR objects over the physical objects if no latency is detected between the AR objects and the physical objects that the AR objects are aligned to during all movements of the physical objects. Additionally, if the relative position of a physical object with respect to the AR device 250 or an IoT device 252 is static, then the precise alignment of an AR object over the physical object can be performed by the AR device 250 or the connected computing devices 252, and 254. If the program 200 determines that the precise alignment cannot be performed by the AR device 250 and the connected computing devices 252, and 254 (step 310, "NO" branch), the program 200 may continue to step 312 to determine the additional computing devices 252, and 254 needed for the precise alignment of the AR objects to the physical objects. The program 200 can determine that the AR device 250 and the connected computing devices 252, and 254 cannot perform the precise alignment of the AR objects over the physical objects if latency is detected between the AR objects and the physical objects that the AR objects are aligned to during any movement of the physical objects.

At 312, if the AR device 250 and the connected computer devices 252, and 254 are unable to continuously track the relative positions of the physical objects and/or are unable to quickly process the data from the connected IoT devices 252 to avoid latency with the AR objects, the program 200 determines the additional computing devices 252, and 254 that are needed for the program 200 to both track the relative positions of the physical objects and process the captured data from the IoT devices 252 in a prompt manner, so that the program 200 can meet the needed level of precision for AR object overlaying. The program 200 can identify the computer devices 252, and 254 needed to continuously identify the physical objects' positions and for the program 200 to offload data and assist in processing the data. The program 200 may use artificial intelligence in determining what additional IoT device(s) 252 are needed to minimize the latency of AR objects to the degree needed by the user and what edge device(s) 254 are needed for the program 200 to offload data to assist in data processing, by utilizing one or more machine learning models to ingest the data gathered by tracking the movements of physical objects in the AR environment, the AR device 250 and the computing devices 252, and 254 used to track the movements of the physical objects, and the computing devices 252, and 254 used to offload data processing from the AR device 250. The machine learning models may be trained to identify what computing devices 252, and 254 are needed for the program 200 to both continuously track the movements of physical objects and process the data from the IoT devices 252, in order for the program 200 to precisely align the AR objects over the physical objects in an AR environment. The machine learning models may be trained on a knowledge corpus comprising learned information gathered from the AR device 250, IoT devices 252, and the edge devices 254.

The program 200 can direct the user on where to place the IoT devices 252 and/or edge devices 254 in the physical environment so that the user can place the computing devices 252, and 254 in their appropriate locations. For example, the program 200 may direct a user to attach a sensor to a physical object. Additionally, the program 200 may direct the user on the number of computing devices 252, and 254 needed in a certain location, or the angle at which to place the computing devices 252, and 254 in relation to a physical object, or how far the user should place a computing device 252, and 254 from a physical object. The program 200 may display on the AR device 250 where to place each IoT device 252 and edge device 254 in the physical environment by displaying an outline, such as a square shape, around an area in a physical environment. The program 200 may determine if an IoT device 252 or edge device 254 is in the correct location using object recognition. The program 200 may detect an IoT device 252 or an edge device 254 when the IoT device 252 or the edge device 254 connects to the program 200.

At 314, the program 200 analyzes the physical objects using the AR device 250 and the connected IoT device(s) 252 and/or edge device(s) 254. The program 200 can analyze the received data from the IoT devices 252 and the edge devices 254. The program 200 can analyze the received data to determine the movement characteristics of the physical objects in the same way as detailed in step 304, the differences comprising the inclusion of the data from the additional computing devices 252, and 254, in the program's 200 classifications of the movement characteristics of the physical objects. Based on the program's 200 analysis, the AR device 250 can continuously receive the positions of the physical objects.

At 316, the program 200 precisely aligns the one or more AR objects over the one or more physical objects based on the data received from the AR device 250 and/or the IoT devices 252 and/or the edge devices 254. Based on the data received from the AR device 250 and/or the IoT devices 252 and/or the edge devices 254, the program 200 can precisely overlay the AR objects over the physical objects and can maintain the desired level of precision of the AR objects over the physical objects. The program 200 can precisely overlay AR objects over physical objects based on the positions of the physical objects. The program 200 can dynamically map an AR object to a physical object using data point mapping, such as A to A prime or B to B prime. The program 200 can continuously determine the positions of the physical objects by monitoring the continuous changes in the relative positions of the physical objects. The program 200 can dynamically update the data point mapping of an AR object to a physical object based on the continuous changes in the relative positions of the physical objects.

Figure 4:
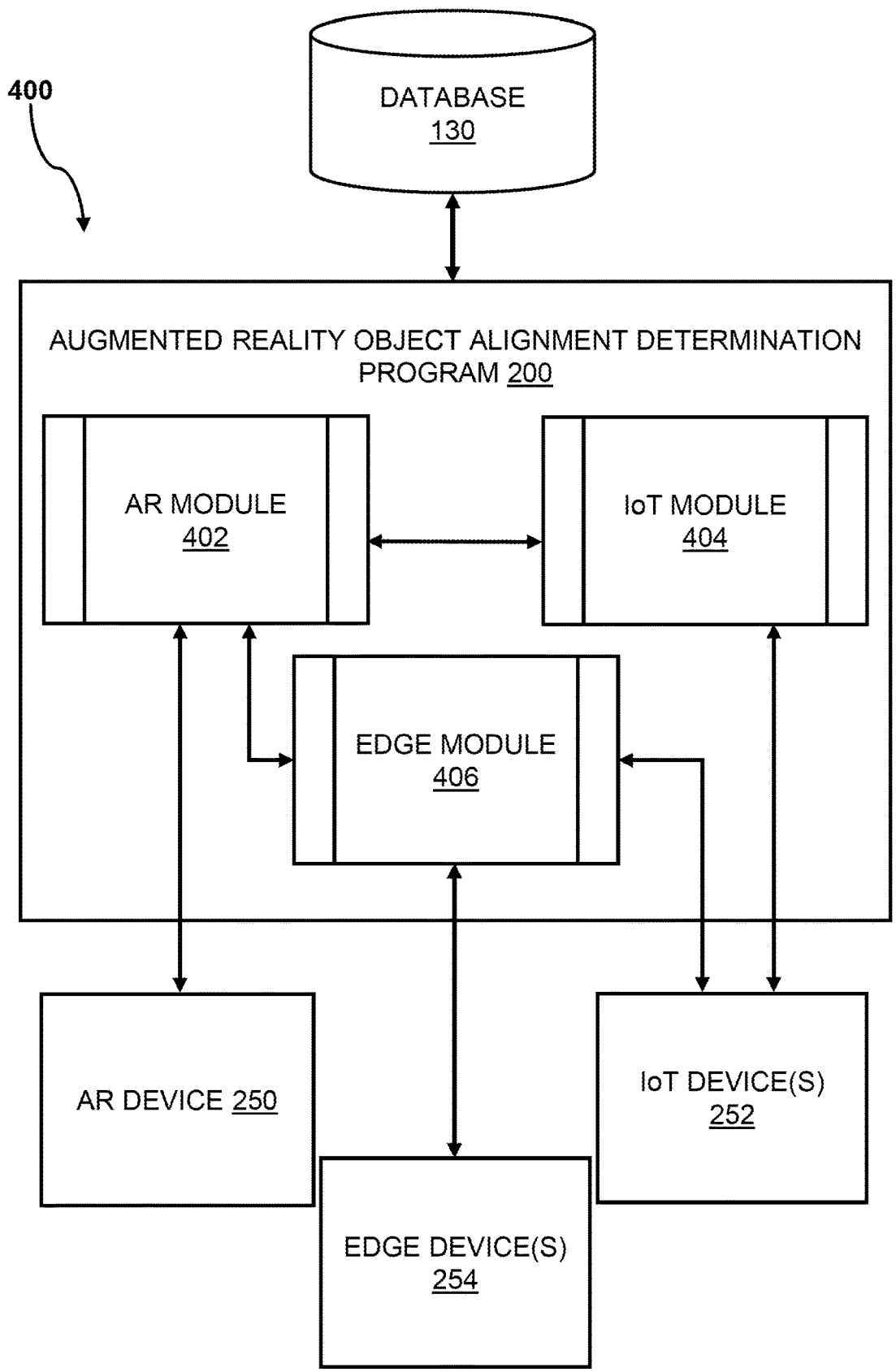
FIG. 4 is a system diagram illustrating an exemplary program environment of an implementation of an augmented reality object alignment determination process according to at least one embodiment.

Referring now to FIG. 4, a system diagram illustrating an exemplary program environment 400 of an implementation of an augmented reality object alignment determination process 300 is depicted according to at least one embodiment. Here, the program 200 comprises an AR module 402, an IoT module 404, and an edge module 406. The exemplary program environment 400 details the interactions between the AR module 402 and the IoT module 404, and the AR module 402 and the edge module 406. Additionally, the exemplary program environment 400 details the interactions between the AR module 402 and the AR device 250, the IoT module 404 and the IoT device(s) 252, the edge module 406 and the IoT device(s) 252, and the edge module 406 and the edge device(s) 254 and the program 200 and the database 130.

The AR module 402 may be used to display the AR environment and the AR objects. The IoT module 404 may be used to communicate with the IoT device(s) 252. The edge module 406 may be used to communicate with the edge device(s) 254.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for precise alignment of augmented reality (AR) objects, the method comprising:
   identifying one or more physical objects in a physical environment to overlay with corresponding AR objects using an AR device and one or more internet of things (IoT) devices;

receiving, from a user, an offset between the physical objects and the one or more corresponding AR objects, wherein the offset comprises a needed level of precision for the one or more AR objects;
monitoring, continuously, positions of the one or more identified physical objects using the AR device and the one or more IoT devices to gather data related to movements of the one or more identified physical objects;
analyzing the gathered data using the AR device and one or more edge devices to determine movement characteristics of the one or more identified physical objects;
evaluating an alignment performance of each of the AR device, the one or more IoT devices, and the one or more edge devices, to determine if enough computing power is available to continuously achieve the needed level of precision based on the determined movement characteristics; and
responsive to determining that enough computing power is available to continuously achieve the identified needed level of precision aligning the corresponding AR objects to the one or more physical objects using the AR device, the one or more IoT devices, and the one or more edge devices.

2. The method of claim 1, wherein the needed level of precision for aligning corresponding AR objects to each of the one or more physical objects is identified based on a received input or lack thereof.

3. The method of claim 1, further comprising:
upon determining that not enough computing power is available to continuously achieve the identified needed level of precision for aligning the corresponding AR objects to each of the one or more physical objects based on the determined movement characteristics, determining one or more additional edge devices and/or one or more additional IoT devices that are needed to continuously achieve the identified needed level of precision for aligning the corresponding AR objects to each of the one or more physical objects based on the determined movement characteristics.

4. The method of claim 3, further comprising:
displaying one or more positions in the physical environment to place the one or more additional edge devices and/or the one or more additional IoT devices on a graphical user interface of the AR device using virtual outlines.

5. The method of claim 3, wherein the one or more additional edge devices and/or the one or more additional IoT devices are determined using one or more trained machine learning models to identify a type and quantity of edge devices and IoT devices needed to achieve enough computing power to continuously achieve the identified needed level of precision for aligning the corresponding AR objects to each of the one or more physical objects based on the determined movement characteristics.

6. The method of claim 1, further comprising:
updating, continuously, the alignment of the corresponding AR objects to the one or more identified physical objects based on a change in the movement characteristics of the one or more identified physical objects.

7. The method of claim 1, wherein aligning the corresponding AR objects to the one or more identified physical objects using the AR device, the one or more IoT devices, and the one or more edge devices comprises offloading a quantity of data processing to the one or more edge devices based on an amount of data that the AR device can process without experiencing latency.

8. A computer system for precise alignment of augmented reality (AR) objects, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying one or more physical objects in a physical environment to overlay with corresponding AR objects using an AR device and one or more internet of things (IoT) devices;
receiving, from a user, an offset between the physical objects and the one or more corresponding AR objects, wherein the offset comprises a needed level of precision for the one or more AR objects;
monitoring, continuously, positions of the one or more identified physical objects using the AR device and the one or more IoT devices to gather data related to movements of the one or more identified physical objects;
analyzing the gathered data using the AR device and one or more edge devices to determine movement characteristics of the one or more identified physical objects;
evaluating an alignment performance of each of the AR device, the one or more IoT devices, and the one or more edge devices, to determine if enough computing power is available to continuously achieve the needed level of precision precisely based on the determined movement characteristics; and
responsive to determining that enough computing power is available to continuously achieve the identified needed level of precision, aligning the corresponding AR objects to the one or more physical objects using the AR device, the one or more IoT devices, and the one or more edge devices.

9. The computer system of claim 8, wherein the needed level of precision for aligning corresponding AR objects to each of the one or more physical objects is identified based on a received input or lack thereof.

10. The computer system of claim 8, further comprising:
upon determining that not enough computing power is available to continuously achieve the identified needed level of precision for aligning the corresponding AR objects to each of the one or more physical objects based on the determined movement characteristics, determining one or more additional edge devices and/or one or more additional IoT devices that are needed to continuously achieve the identified needed level of precision for aligning the corresponding AR objects to each of the one or more physical objects based on the determined movement characteristics.

11. The computer system of claim 10, further comprising:
displaying one or more positions in the physical environment to place the one or more additional edge devices and/or the one or more additional IoT devices on a graphical user interface of the AR device using virtual outlines.

12. The computer system of claim 10, wherein the one or more additional edge devices and/or the one or more additional IoT devices are determined using one or more trained machine learning models to identify a type and quantity of edge devices and IoT devices needed to achieve enough computing power to continuously achieve the identified needed level of precision for aligning the corresponding AR objects to each of the one or more physical objects based on the determined movement characteristics.

13. The computer system of claim 8, further comprising:
updating, continuously, the alignment of the corresponding AR objects to the one or more identified physical objects based on a change in the movement characteristics of the one or more identified physical objects.

14. The computer system of claim 8, wherein aligning the corresponding AR objects to the one or more identified physical objects using the AR device, the one or more IoT devices, and the one or more edge devices comprises offloading a quantity of data processing to the one or more edge devices based on an amount of data that the AR device can process without experiencing latency.

15. A computer program product for precise alignment of augmented reality (AR) objects, the computer program product comprising:
one or more computer-readable tangible storage medium and program instructions stored on at least one of the one or more tangible storage medium, the program instructions executable by a processor to cause the processor to perform a method comprising:
identifying one or more physical objects in a physical environment to overlay with corresponding AR objects using an AR device and one or more internet of things (IoT) devices;
receiving, from a user, an offset between the physical objects and the one or more corresponding AR objects, wherein the offset comprises a needed level of precision for the one or more AR objects;
monitoring, continuously, positions of the one or more identified physical objects using the AR device and the one or more IoT devices to gather data related to movements of the one or more identified physical objects;
analyzing the gathered data using the AR device and one or more edge devices to determine movement characteristics of the one or more identified physical objects;
evaluating an alignment performance of each of the AR device, the one or more IoT devices, and the one or more edge devices, to determine if enough computing power is available to continuously achieve the needed level of precision based on the determined movement characteristics; and
responsive to determining that enough computing power is available to continuously achieve the identified needed level of precision, aligning the corresponding AR objects to the one or more physical objects using the AR device, the one or more IoT devices, and the one or more edge devices.

16. The computer program product of claim 15, wherein the needed level of precision for aligning corresponding AR objects to each of the one or more physical objects is identified based on a received input or lack thereof.

17. The computer program product of claim 15, further comprising:
upon determining that not enough computing power is available to continuously achieve the identified needed level of precision for aligning the corresponding AR objects to each of the one or more physical objects based on the determined movement characteristics, determining one or more additional edge devices and/or one or more additional IoT devices that are needed to continuously achieve the identified needed level of precision for aligning the corresponding AR objects to each of the one or more physical objects based on the determined movement characteristics.

18. The computer program product of claim 17, further comprising:
displaying one or more positions in the physical environment to place the one or more additional edge devices and/or the one or more additional IoT devices on a graphical user interface of the AR device using virtual outlines.

19. The computer program product of claim 17, wherein aligning the corresponding AR objects to the one or more identified physical objects using the AR device, the one or more IoT devices, and the one or more edge devices comprises offloading a quantity of data processing to the one or more edge devices based on an amount of data that the AR device can process without experiencing latency, and wherein the one or more additional edge devices and/or the one or more additional IoT devices are determined using one or more trained machine learning models to identify a type and quantity of edge devices and IoT devices needed to achieve enough computing power to continuously achieve the identified needed level of precision for aligning the corresponding AR objects to each of the one or more physical objects based on the determined movement characteristics.

20. The computer program product of claim 15, further comprising:
updating, continuously, the alignment of the corresponding AR objects to the one or more identified physical objects based on a change in the movement characteristics of the one or more identified physical objects.

* * * * *